US 6,609,418 B2

(12) United States Patent
Yamagiwa et al.

(10) Patent No.: US 6,609,418 B2
(45) Date of Patent: Aug. 26, 2003

(54) APPARATUS FOR DETECTING TIRE AIR PRESSURE FOR MOTOR VEHICLE

(75) Inventors: Toshio Yamagiwa, Saitama (JP);
Tomoyuki Harada, Saitama (JP);
Hiroyuki Kawasaki, Saitama (JP);
Osamu Bunya, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/875,904

(22) Filed: Jun. 8, 2001

(65) Prior Publication Data

US 2002/0005065 A1 Jan. 17, 2002

(30) Foreign Application Priority Data

Jun. 9, 2000 (JP) ........................................ 2000-174515
Jan. 26, 2001 (JP) ........................................ 2001-017852

(51) Int. Cl.⁷ ........................ G01M 17/02; B60C 23/02
(52) U.S. Cl. ........................................ 73/146; 73/146.2
(58) Field of Search ......................... 73/146–146.8; 152/416, 418; 340/58, 442–444

(56) References Cited

U.S. PATENT DOCUMENTS

| 4,763,709 | A | * | 8/1988 | Scholer ........................ 152/416 |
| 5,805,120 | A | * | 9/1998 | Yamada et al. ................ 345/7 |
| 6,011,463 | A | * | 1/2000 | Cormier, Sr. ............... 340/447 |
| 6,226,583 | B1 | * | 5/2001 | Iwata .......................... 701/51 |
| 6,275,148 | B1 | * | 8/2001 | Takamura et al. .......... 340/442 |
| 6,446,023 | B1 | * | 9/2002 | Ernst ........................... 702/138 |

FOREIGN PATENT DOCUMENTS

JP          9-240446          9/1997

* cited by examiner

Primary Examiner—Hezron Williams
Assistant Examiner—Marissa Ferguson
(74) Attorney, Agent, or Firm—Birch, Stewart, Kolasch & Birch, LLP

(57) ABSTRACT

A tire air pressure detecting apparatus has an tire air pressure detecting mechanism for detecting the air pressure of a tire of a motorcycle, and a second control mechanism for comparing an actual air pressure detected by the tire air pressure detecting mechanism with a stored air pressure threshold, and controlling an engine output when the actual air pressure becomes lower than said air pressure threshold. Since the air pressure detecting apparatus comprises a small number of constituent elements including the tire air pressure detecting mechanism and the second control mechanism for reducing an engine output under certain conditions, the tire air pressure detecting apparatus can easily be reduced in size and cost.

13 Claims, 8 Drawing Sheets

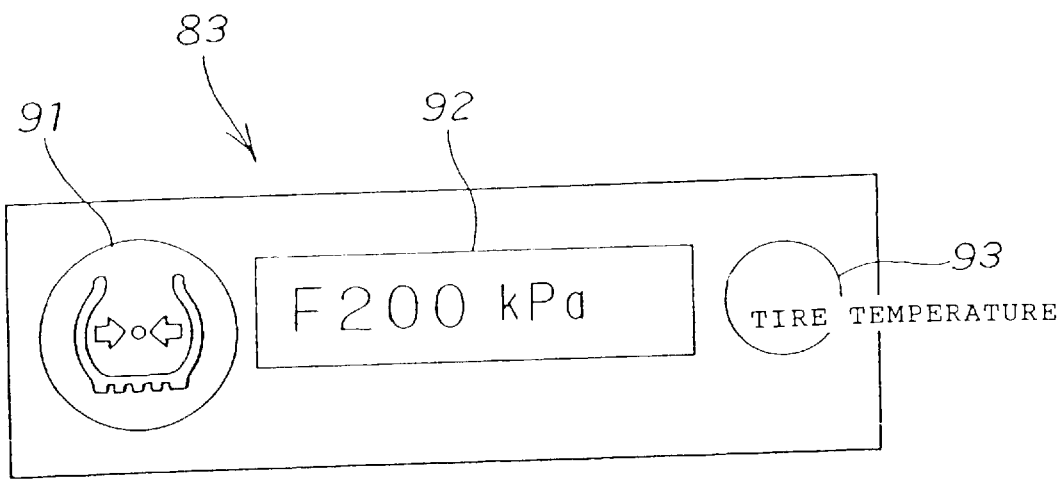
FIG. 5
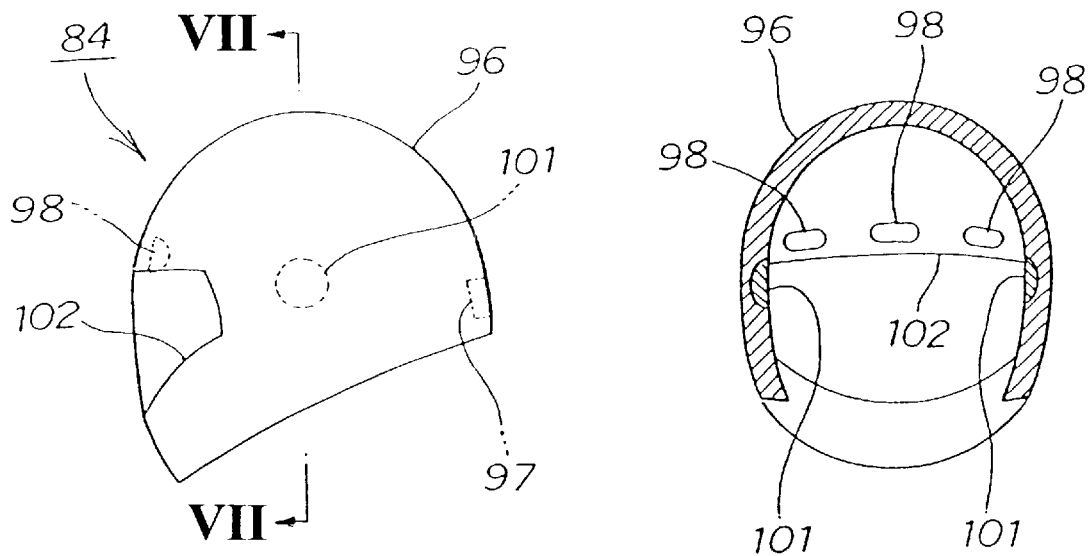
FIG. 6           FIG. 7

APPARATUS FOR DETECTING TIRE AIR PRESSURE FOR MOTOR VEHICLE

BACKGROUND OF THE INVENTION

1. Field of the Invention

The present invention relates to an apparatus for detecting tire air pressure for a motor vehicle, which is operable to lower the speed of the vehicle when the tire air pressure becomes lower than a predetermined value and reliably indicate to a driver of the vehicle that a reduction in tire air pressure has occurred.

2. Description of Background Art

One apparatus for detecting whether the air pressure of a tire for a motor vehicle has been reduced or not is known from Japanese Patent Laid-open No. Hei 9-240446 entitled "BRAKE CONTROL APPARATUS", for example.

FIG. 4 of the above publication shows a brake control apparatus, wherein when the air pressure of the tire of a left or right front wheel becomes lower than a predetermined value, and the rate of reduction of the air pressure is equal to or higher than a predetermined value based on signals from a left front wheel air pressure sensor 14 and a right front wheel air pressure sensor 15, a solenoid-operated valve associated with the wheel laterally opposite to the wheel whose tire air pressure has been reduced, i.e., a left front wheel solenoid-operated valve 49 or a right front wheel solenoid-operated valve 50, is operated to brake the right front wheel or the left front wheel, and a warning unit 8 is actuated.

With the apparatus disclosed in the above publication, however, the wheel is braked only under the condition when the air pressure of the tire is lowered. Accordingly, if the wheel is braked while the throttle opening is increasing, the wheel may not be braked sufficiently and hence the vehicle speed may not be lowered, since the engine output is increasing.

Furthermore, since solenoid-operated valves for braking the wheels are required for the respective wheels, the apparatus has a high cost and a complex process to control those solenoid-operated valves is required.

In addition, it may be difficult for the driver of the vehicle to confirm the warning from the warning unit 8, if the vehicle is being operated in bright and/or noisy areas.

SUMMARY OF THE INVENTION

It is an object of the present invention to provide an apparatus for detecting a tire air pressure for a motor vehicle, which is capable of ① lowering the speed of the vehicle easily with a simple arrangement and ② reliably indicating a reduction in the air pressure to a driver of the vehicle when the tire air pressure becomes lower than a predetermined value.

To achieve the above object, there is provided, in accordance with a first aspect of the present invention, an apparatus for detecting tire air pressure for a motor vehicle includes tire air pressure detecting means for detecting the air pressure of the tire of the motor vehicle, and control means for comparing an actual air pressure detected by the tire air pressure detecting means with a stored air pressure threshold. Furthermore, the engine output is controlled when the actual air pressure becomes lower than the air pressure threshold.

In order to control engine output, several processes are available which include ① adjusting the throttle opening of the engine, ② performing ignition control so as not to increase engine rotational speed beyond a predetermined value, ③ cutting off the fuel, and ④ changing the resistance of an AC generator. These processes are carried out by control means to control the engine output to lower the vehicle speed.

In accordance with a second aspect of the present invention, an apparatus for detecting tire air pressure for a motorcycle includes tire air pressure detecting means for detecting the air pressure of a tire of a motorcycle, wherein the actual air pressure detected by the tire air pressure detecting means is compared with a stored air pressure threshold. If the actual air pressure becomes lower than the air pressure threshold, a light-emitting member or a sound-generating member disposed on or around an instrumental panel of the vehicle is operated to issue a warning.

When the actual air pressure of the tire drops below the air pressure threshold, the light-emitting member or the sound-generating member disposed on or around the instrumental panel is operated to issue a warning. Even in bright and/or noisy areas, the light-emitting member is easily visually recognizable in the same manner as other various instruments in the instrument panel. This allows a motorcycle driver to be reliably informed of the reduction in air pressure. It should also be noted that it is more preferable to operate both the light-emitting member and the sound-generating member in order to ensure that the driver is informed of the reduction in air pressure under various driving conditions.

According to a third aspect of the present invention, an apparatus for detecting a tire air pressure for a motorcycle includes tire air pressure detecting means for detecting the air pressure of a tire of a motorcycle, wherein the actual air pressure detected by the tire air pressure detecting means is compared with a stored air pressure threshold. When the actual air pressure becomes lower than the air pressure threshold, a light-emitting member or a sound-generating member installed in a driver's helmet is operated to issue a warning.

When the actual air pressure of the tire drops below the air pressure threshold, the light-emitting member or the sound-generating member disposed in the driver's helmet is operated to issue a warning. Accordingly, even in bright and/or noisy areas, the light-emitting member is easily visually recognizable, allowing a motorcycle driver to be informed of the reduction in the air pressure. It should also be noted that it is more preferable to operate both the light-emitting member and the sound-generating member in order to ensure that the driver is informed of the reduction in air pressure under various driving conditions.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 5 is a view of display means of the air pressure detecting apparatus according to the present invention;

FIG. 6 is a view of warning means of the air pressure detecting apparatus according to the present invention;

FIG. 7 is a cross-section along the line VII—VII of FIG. 6;

DESCRIPTION OF THE PREFERRED EMBODIMENTS

Figure 1:
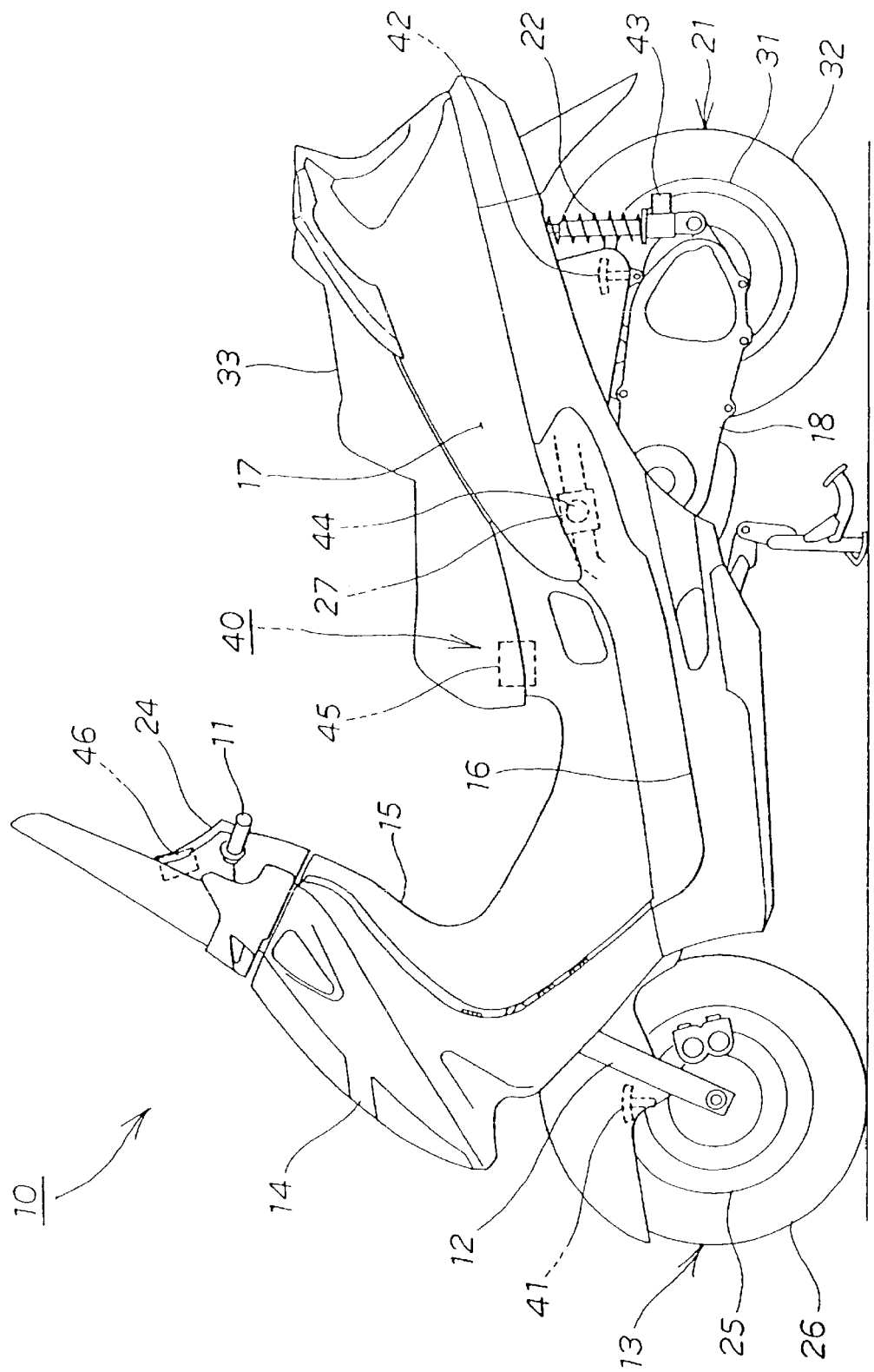
FIG. 1 is a side elevational view of a motorcycle including an apparatus for detecting tire air pressure for a motor vehicle according to the present invention.

Embodiments of the present invention will now be described below with reference to the accompanying drawings. It should be noted that the drawings should be viewed in the direction in which the reference characters are arranged.

FIG. 1 is a side elevational view of a motorcycle including an apparatus for detecting tire air pressure for a motor vehicle according to the present invention. A motorcycle 10 includes a handle 11, a front fork 12 and a front wheel 13. The front fork 12 and front wheel 13 are steerably mounted on a lower portion of the handle 11. A front cover 14 and a front inner cover 15 cover the lower portion of the handle 11 and an upper portion of the front fork 12. A floor step 16 is disposed behind a lower portion of the front cover 14. A body cover 17 extends upwardly from a rear portion of the floor step 16. A power unit 18 extends rearwardly from within the body cover 17. A rear wheel 21 is mounted on a rear portion of the power unit 18. Furthermore, an air suspension device 22 is connected to a rear end of the power unit 18 and a motorcycle frame, not shown, is disposed in the body cover 17.

An instrumental panel 24 is attached to the handle 11. The front wheel 13 includes a wheel 25 and a tire 26. The power unit 18 has an engine that is supplied with fuel from a carburetor 27. The rear wheel 21 includes a wheel 31 and a tire 32. A seat 33 is mounted on the body cover 17.

An apparatus 40 for detecting tire air pressure for a motor vehicle according to the present invention (hereinafter referred to as "air pressure detecting apparatus 40") includes a front wheel tire air pressure detecting device 41 attached to the wheel 25 of the front wheel 13 for detecting air pressure and temperature of the tire 26. A rear wheel tire air pressure detecting device 42 is attached to the wheel 31 of the rear wheel 21 for detecting air pressure and temperature of the tire 32. An air suspension air pressure detecting device 43 is attached to the air suspension device 22. A throttle opening adjusting device 44 is attached to the carburetor 27, for example, for adjusting the throttle opening. The apparatus 40 also includes a control device 45 for receiving signals from the front wheel tire air pressure detecting device 41, the rear wheel tire air pressure detecting device 42, and the air suspension air pressure detecting device 43. In addition, operating warning means, described later on, is provided for controlling the throttle opening adjusting device 44. Furthermore, a display device 46 responsive to a signal from the control device 45 is provided for displaying the air pressure of the tire 26 of the front wheel 13, the temperature of the tire 26 of the front wheel 13, the air pressure of the tire 32 of the rear wheel 21, the temperature of the tire 32 of the rear wheel 21, and the air pressure of the air suspension device 22. Finally, the apparatus 40 includes a warning device, as will be described later on.

The control device 45 is disposed below the seat 33, for example, and the display device 46 is mounted on the instrumental panel 24, for example.

Figure 2:
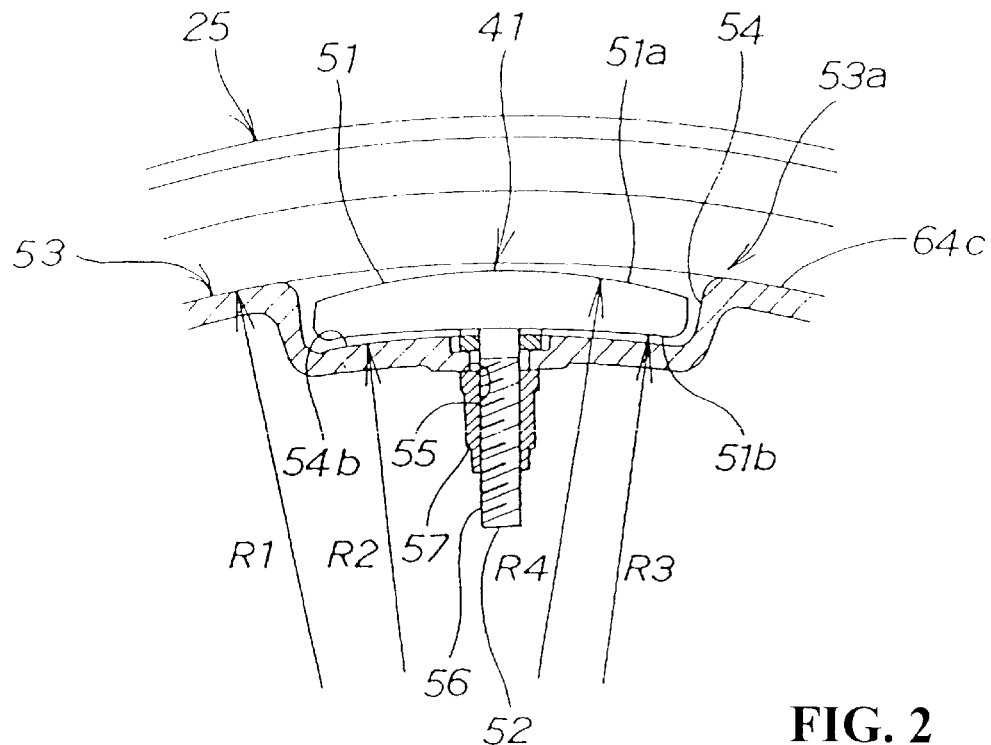
FIG. 2 is a view showing a tire air pressure detecting device in the air pressure detecting apparatus according to the present invention.

FIG. 2 is a first cross-sectional view showing the manner in which a tire air pressure detecting device in the air pressure detecting apparatus of the present invention is installed. The front wheel tire air pressure detecting device 41 will be described below. The rear wheel tire air pressure detecting device 42 is identical in structure to the front wheel tire air pressure detecting device 41, and will not be described below with reference to FIG. 2 and the following figures.

The tire air pressure detecting device 41 comprises a main detector body 51 and a tire valve 52 attached to the main detector body 51. The tire valve 52 is opened only when air is supplied into the tire 26 (see FIG. 1) and is closed otherwise to prevent air supplied into the tire 26 from flowing out of the tire 26. The main detector body 51 is disposed in a hole 54 defined in the bottom of a rim 53. The tire valve 52 is inserted in a valve insertion hole 55 defined in the bottom of the rim 53. A nut 57 is threaded over an externally threaded outer circumferential surface 56 of the tire valve 52, thus fastening the tire air pressure detecting device 41 to the wheel 25.

Figure 3:
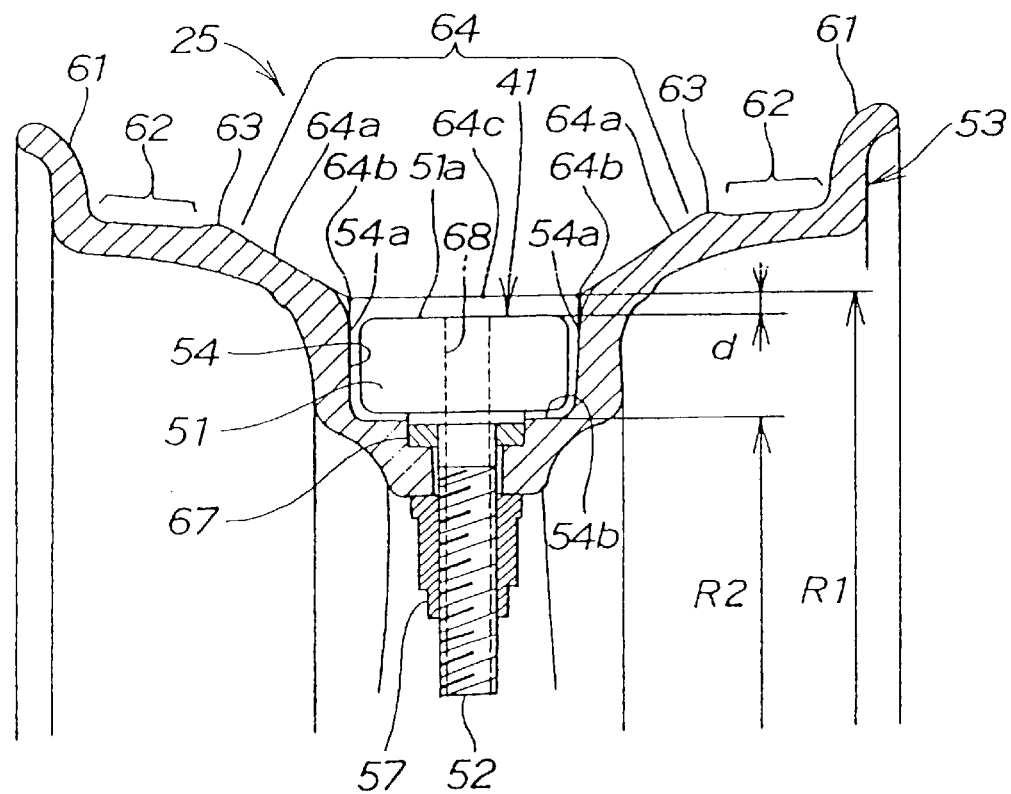
FIG. 3 is a cross-sectional view of the tire air pressure detecting device in the air pressure detecting apparatus according to the present invention.

FIG. 3 is a second cross-sectional view showing the manner in which the tire air pressure detecting device in the air pressure detecting apparatus of the present invention is installed.

The wheel 25 includes a pair of flanges 61, a pair of bead seats 62 disposed inwardly of the respective flanges 61, a pair of humps 63 raised inwardly of the respective bead seats 62, a rim drop 64 lowered between the humps 63, and the recess 54 defined in the rim drop 64.

The bead seats 62 serve to hold the beads of the tire 26 (see FIG. 1).

The humps 63 are annular ridges for preventing the tire 26 from being dislodged from the bead seats 62 of the wheel 25.

The rim drop 64 is deeply recessed to allow the tire 26 to be attached to and detached from the wheel 25.

The tire air pressure detecting device 41 is attached to the rim 53 such that the main detector body 51 has an outer surface 51a disposed inwardly of the bottom surface (described later on) of the rim drop 64 by a distance d. A seal member 67 serves to prevent air from leaking out from the air chamber in the tire 26. A vent hole 68 (closed by a valve body, not shown) is defined in the tire valve 52 to provide communication between the interior and exterior of the tire 26.

As described above with reference to FIGS. 2 and 3, with the main detector body 51 housed in the recess 54 in the rim 53, the beads of the tire 26 are prevented from interfering with the main detector body 51 when the tire 26 is installed on or removed from the wheel 25 using a tire changer or the like. Therefore, the main detector body 51 is protected against damage.

It is assumed that a plane formed by circumferentially and transversely interconnecting positions 64b where opposite sides 54a of the recess 54 and opposite slanted surfaces 64a of the rim drop 64 intersect each other represents a bottom surface 64c of the rim drop 64, the distance (radius) from the center of the wheel 25 to the bottom surface 64c is represented by R1, and the distance (radius) from the center of the wheel 25 to the bottom surface 54b of the recess 54 is represented by R2.

Referring back to FIG. 2, the main detector body 51 is of a curved shape along an inner surface 53a of the rim 53, i.e., a combination of the bottom surface 64c of the rim drop 64 and the bottom surface 54b of the recess 54.

The main detector body 51 has an inner surface 51b having a radius R3 of curvature and an outer surface 51a having a radium R4 of curvature. The radii R1, R2, R3, R4 satisfy the following relationships:

$R4 \leq R1$,      (1)

$R2 \leq R3$,      (2)

$R4 \leq R3$      (3)

It is assumed that the tire air pressure detecting apparatus 41 is to be installed on a wheel having a rim diameter ranging from 10 to 19 inches, for example.

(1) By setting the radius R4 of the outer surface 51a of the main detector body 51 to a value smaller than the radium R1 of the bottom surface 64c of the rim drop 64 (see FIG. 3) of the wheel having the minimum rim diameter of 10 inches, the outer surface 51a of the main detector body 51 does not project outwardly from the bottom surface 64c of the rim drop 64, i.e., $R4 \leq R1$, when the tire air pressure detecting apparatus 41 is installed on any wheels having rim diameters in the range of from 10 to 19 inches.

(2) By setting the radius R3 of the inner surface 51b of the main detector body 51 to a value greater than the radium R2 of the bottom surface 54b of the recess 54 of the wheel having the maximum rim diameter of 19 inches, the inner surface 51b of the main detector body 51 does not interfere with the bottom surface 54b of the recess 54, i.e., $R2 \leq R3$, even when the tire air pressure detecting apparatus 41 is installed on any wheels having rim diameters in the range of from 10 to 19 inches.

(3) If R1 (the dimension of the wheel having a rim diameter of 10 inches) $\leq$ R2 (the dimension of the wheel having a rim diameter of 19 inches), then since $R4 \leq R1 \leq R2 \leq R3$, $R4 \leq R3$ is obtained from the equations (1) and (2).

As described above with reference to FIG. 2, since the main detector body 51 is of a curved shape along the inner surface 53a of the rim 53, the main detector body 51 has no projection toward the tire 26 (see FIG. 1), and hence the beads of the tire 26 are prevented from interfering with the main detector body 51 when the tire 26 is installed on or removed from the wheel 25. Therefore, the main detector body 51 is protected against damage.

Figure 4:
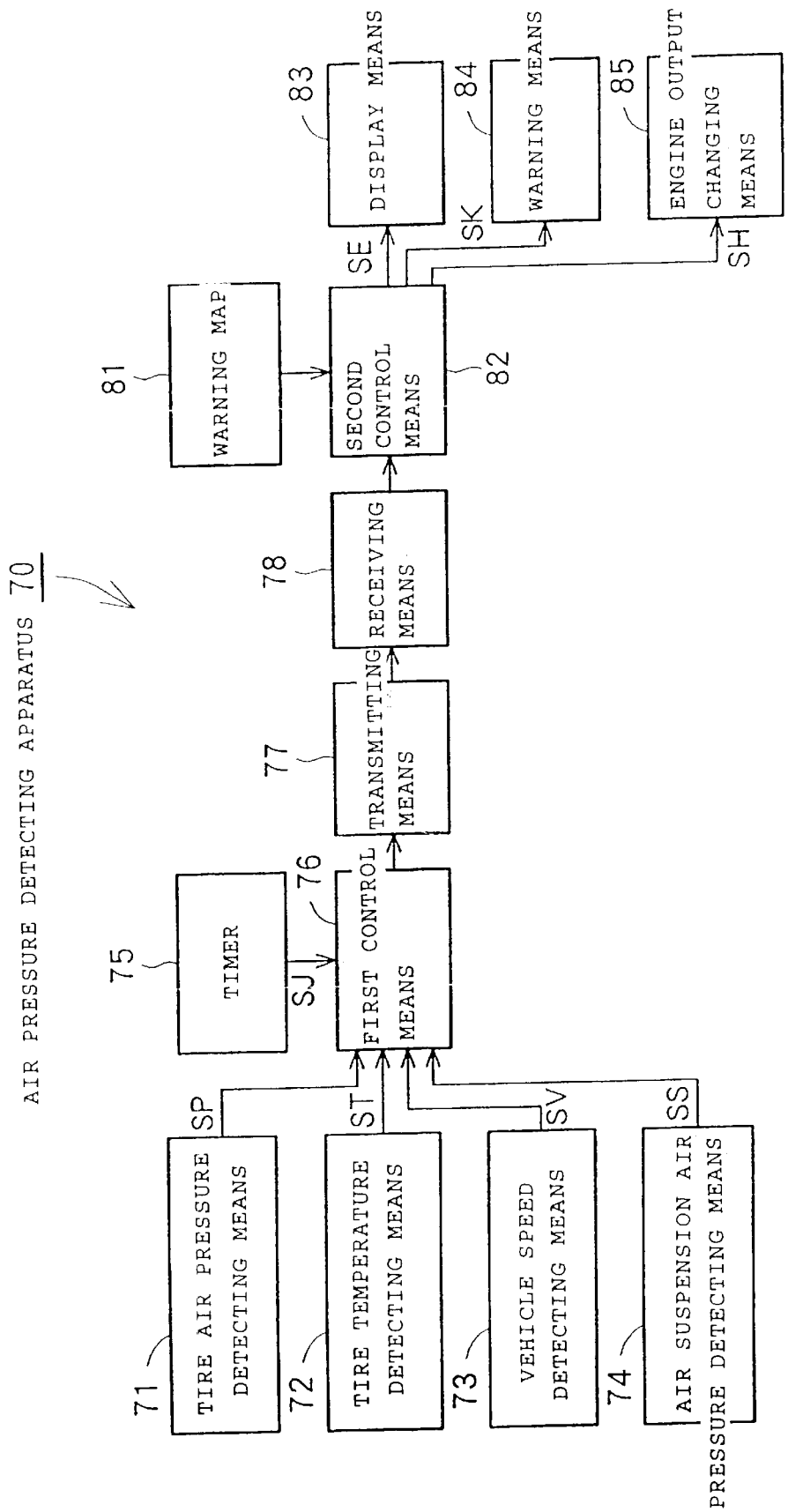
FIG. 4 is a block diagram showing a basic arrangement of the air pressure detecting apparatus according to the present invention.

FIG. 4 is a block diagram showing a basic arrangement of the air pressure detecting apparatus according to the present invention. The air pressure detecting apparatus 70 includes tire air pressure detecting means 71 for detecting tire air pressure of the front wheel 13 (see FIG. 1) and the rear wheel 21 (see FIG. 1), tire temperature detecting means 72 for detecting tire temperature of the front wheel 13 and the rear wheel 21, vehicle speed detecting means 73 for detecting a vehicle speed of the motorcycle 10 (see FIG. 1), and air suspension air pressure detecting means 74 for detecting air pressure of the air suspension device 22 (see FIG. 1). Furthermore, the air pressure detecting apparatus 70 includes a timer 75 and first control means 76 for detecting an air pressure signal SP from the tire air pressure detecting means 71, a temperature signal ST from the tire temperature detecting means 72, a vehicle speed signal SV from the vehicle speed detecting means 73, and a suspension air pressure signal SS from the air suspension air pressure detecting means 74 at given time intervals, i.e., at a given frequency, based on a time signal SJ from the timer 75. In addition, transmitting means 77 are provided for transmitting detected signal data, receiving means 78 are provided for receiving the signal data transmitted from the transmitting means 77, a warning map 81 is provided for representing a range of tire air pressures and vehicle speeds stored in a ROM for issuing a warning and controlling an engine output when the tire air pressures of the front wheel 13 and the rear wheel 21 are lowered. Furthermore, second control means 82 are provided, as the control means according to the first aspect of the present invention, for generating a display signal SE based on the signal data received by the receiving means 78, and generating a warning signal SK and an engine control signal SH based on the signal data received by the receiving means 78 and the warning map 81. In addition, display means 83 are provided for displaying information based on the display signal SE from the second control means 82, warning means 84 are provided for issuing a warning based on the warning signal SK from the second control means 82, and engine output changing means 85 are provided for changing engine output based on the engine control signal SH from the second control means 82.

Each of the tire air pressure detecting means 71 and the air suspension air pressure detecting means 74 includes a pressure sensor, for example, and the tire temperature detecting means 72 includes a temperature sensor such as a thermocouple or the like, for example.

The first control means 76 reduces the frequency of detecting the tire air pressure when the vehicle speed is low, e.g., once in every 15 seconds, increases the frequency of detecting the tire air pressure when the vehicle speed is high, e.g., once in every 0.5 second, and does not detect the tire air pressure when the motorcycle is at rest.

The relationship between the vehicle speed and the detecting frequency may be represented by a linear curve indicative of direct proportion, or may be represented by a quadratic curve such that the detecting frequency increases quadratically as the vehicle speed increases, or may be represented by a curve such that the detecting frequency varies stepwise when the vehicle speed exceeds a certain value, e.g., 80 km/h.

By lowering the detecting frequency with the first control means 76 when the vehicle speed is low, the consumption of the battery is reduced. In addition, by not detecting the tire air pressure when the motorcycle is at rest, the consumption of the battery is further reduced. The tire air pressure detecting apparatus 41 (see FIG. 1) can thus be used for a prolonged period of time.

By increasing the detecting frequency with the first control means 76 when the vehicle speed is high, a reduction in the tire air pressure can be detected earlier, allowing a warning to be issued and engine output to be controlled quickly.

The engine output changing means 85 is a device for changing the engine output in response to the engine control signal SH. For example, the engine output changing means 85 may comprise an actuator that operates based on a negative pressure or a hydraulic pressure in the engine or is in the form of a motor or a solenoid, the actuator being mounted on a throttle shaft of the engine for actuating the throttle shaft, or an ignition device under ignition control, or a device for cutting off fuel, or a device for changing the resistance of an AC generator.

Each of the tire air pressure detecting devices 41, 42 shown in FIG. 1 includes, as shown in FIG. 4, the tire air pressure detecting means 71, the tire temperature detecting means 72, the vehicle speed detecting means 73, the timer 75, the first control means 76, the transmitting means 77, and a battery, not shown, serving as a power supply for these means.

The air suspension air pressure detecting device 43 shown in FIG. 1 includes the air suspension air pressure detecting means 74 shown in FIG. 4. The throttle opening adjusting device 44 shown in FIG. 1 includes the engine output changing means 85 shown in FIG. 4. The control device 45 shown in FIG. 1 includes the second control means 82 shown in FIG. 4. The display device 46 shown in FIG. 1 includes the display means 83 shown in FIG. 4.

The warning means 84 shown in FIG. 4 includes a lamp and a speaker in a helmet, as will be described later on.

FIG. 5 is a front elevational view of the display means 83 of the air pressure detecting apparatus according to the present invention.

In FIG. 5, the display means 83 has a tire air pressure indicator 91, an air pressure value display unit 92, and a tire temperature indicator 93.

The tire air pressure indicator 91, the air pressure value display unit 92, and the tire temperature indicator 93 selectively display values from the front wheel 13 (see FIG. 1) and the rear wheel 21 (see FIG. 1).

FIGS. 6 and 7 are views showing the warning means of the air pressure detecting apparatus according to the present invention. FIG. 6 is a side elevational view of the warning means, and FIG. 7 is a cross-sectional view taken along line VII—VII of FIG. 6.

The warning means 84 includes a warning signal receiver 97 for receiving a signal transmitted from the second control means 82 (see FIG. 4), lamps 98 as a light-emitting member for issuing a warning with light, and speakers 101 as a sound-generating member for issuing a warning with sound. The warning signal receiver 97, the lamps 98, and the speakers 101 are mounted in a driver's helmet 96.

In FIG. 7, the lamps 98 are mounted on an inner edge of an upper side of a front opening 102 in the helmet 96. The lamps 98 should preferably be capable of emitting highly visible light of red, orange, yellow, or the like.

The speakers 101 are embedded in inner walls of the helmet 96 which correspond to the positions of the ears of the driver.

The speakers 101 should preferably emit a voice sound, for example, for drawing attention to and alerting the driver.

As described above, the present invention resides in that the tire air pressure detecting means 71 detects an air pressure of the tires 26, 32 of the motorcycle 10, the actual air pressure Pt (described later on with reference to FIGS. 11A and 11B) detected by the tire air pressure detecting means 71 and a stored air pressure threshold Pb (described later on with reference to FIGS. 11A and 11B) are compared with each other, and when the actual air pressure Pt drops below the air pressure threshold Pb, the lamps 98 and the speakers 101 mounted in the driver's helmet 96 are operated to issue a warning.

When the actual air pressure Pt of the tires 26, 32 drops below the air pressure threshold Pb, the lamps 98 and the speakers 101 mounted in the driver's helmet 96 are simultaneously operated or either the lamps 98 or the speakers 101 are operated to issue a warning. Even in bright and noisy areas, since the lamps 98 in the helmet 96 are highly visible, the driver of the motorcycle 10 can be reliably informed of the reduction in tire air pressure.

By generating a voice sound as a warning from the speakers 101, the content of the warning can be indicated to the driver reliably and gently. For example, when a warning is issued while the motorcycle is running, the driver can act calmly accordingly.

Figure 8:
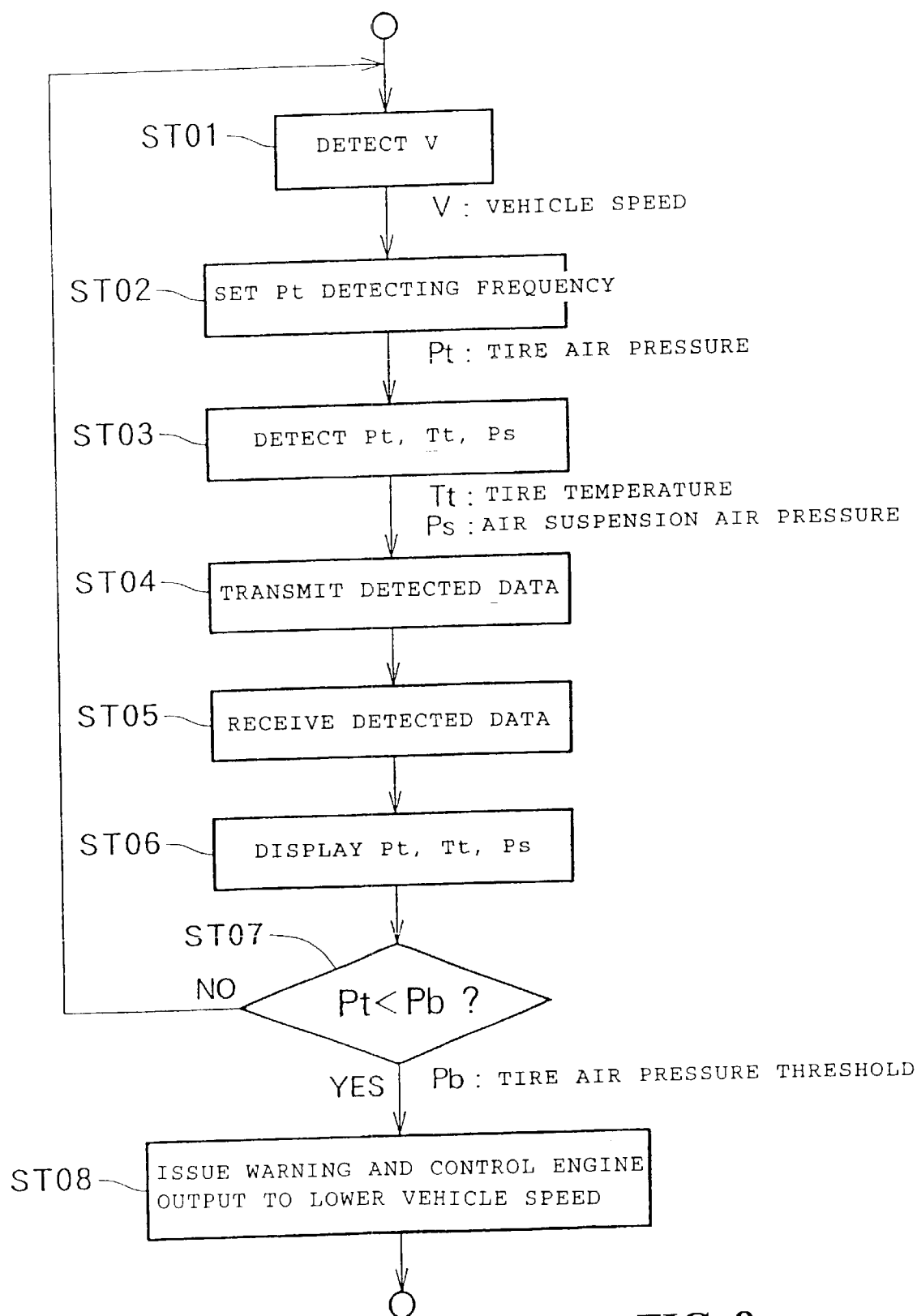
FIG. 8 is a flowchart of a control process carried out by the air pressure detecting apparatus according to the present invention.

FIG. 8 is a flowchart of a control process carried out by the air pressure detecting apparatus according to the present invention. In FIG. 8, "STxx" represents a step number as follows:

ST01 . . . The vehicle speed detecting means detects a vehicle speed V;

ST02 . . . The first control means sets a detecting frequency for the tire air pressure Pt based on the obtained vehicle speed signal;

ST03 . . . The tire air pressure Pt, the tire temperature Tt, and the air suspension air pressure Ps are detected at the detecting frequency thus set;

ST04 . . . The transmitting means transmits the detected data;

ST05 . . . The receiving means receives the detected data transmitted from the transmitting means;

ST06 . . . The second control means displays the detected data received by the receiving means on the display means;

ST07 . . . The second control means determines whether the tire air pressure Pt received as the actual air pressure by the receiving means is lower than the tire air pressure threshold Pb or not, i.e., Pt<Pb;

If Pt<Pb (NO), control goes back to ST01;

If not Pt<Pb (YES), control goes to ST08; and

ST08 . . . The warning means issues a warning, and the engine output changing means changes an engine output to lower the vehicle speed.

If the air pressure detected by the tire air pressure detecting means 71 and the air suspension air pressure detecting means 74 in FIG. 4 is not constant, but varies, due to road conditions and motorcycle vibrations, then the first control means 76 or the second control means 82 averages the detected data or uses a noise filter to obtain highly accurate air pressure data.

As described above with reference to FIGS. 1, 4, and 8, the air pressure detecting apparatus includes the tire air pressure detecting means 71 for detecting a tire air pressure of the tires 26, 32 of the motorcycle 10, and the second control means 82 for comparing the actual air pressure Pt detected by the tire air pressure detecting means 71 and a stored air pressure threshold Pb with each other, and controlling an engine output when the actual air pressure Pt drops below the air pressure threshold Pb.

When the actual air pressure Pt drops below the air pressure threshold Pb, the engine output can be reduced by reducing the throttle opening of the engine to lower the vehicle speed.

Therefore, the vehicle speed can easily be lowered by reducing the throttle opening. In order to reduce the throttle opening, only one throttle opening adjusting means in the form of an actuator that operates based on a negative pressure or a hydraulic pressure in the engine or in the form of a motor or a solenoid is mounted on the throttle shaft. Such a simple arrangement assures safety of the motorcycle.

The air pressure detecting apparatus 40 includes a smaller number of parts, i.e., the tire air pressure detecting means 71 and the second control means 82 for reducing the engine output under certain conditions, than the conventional air pressure detecting apparatus. The air pressure detecting apparatus 40 can hence easily be reduced in size and cost.

Figure 9:
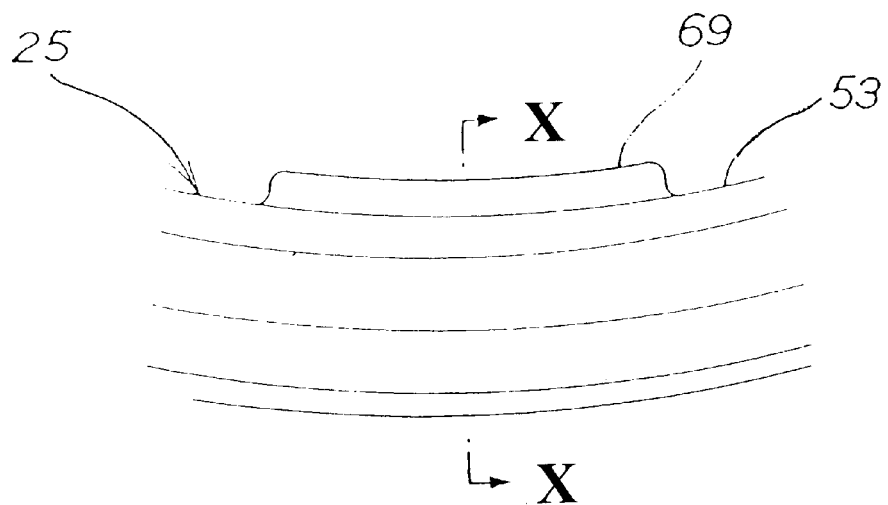
FIG. 9 is a view showing a wheel on which the tire air pressure detecting device according to the present invention is installed.
Figure 10:
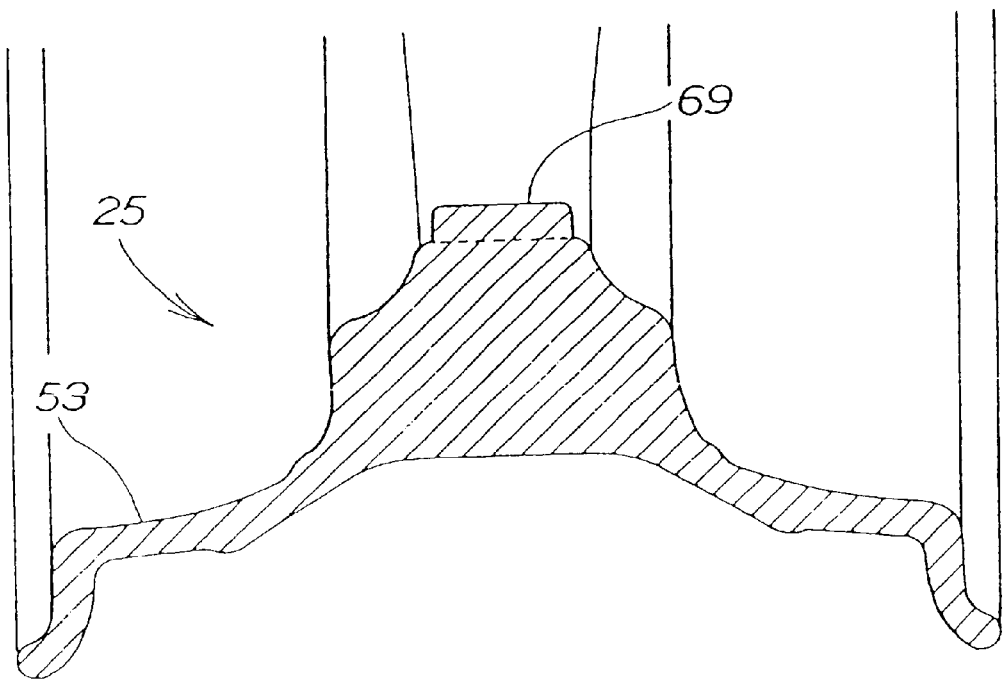
FIG. 10 is a cross-section along line X—X of FIG. 9.

FIGS. 9 and 10 show a wheel on which the tire air pressure detecting device according to the present invention is installed. FIG. 9 is a side elevational view of the wheel, and FIG. 10 is a cross-sectional view taken along line X—X of FIG. 9.

In FIG. 9, the wheel 25 includes a weight 69 integral with the rim 53 for counterbalancing the tire air pressure detecting device 41, disposed 180° opposite to the position of the tire air pressure detecting device 41 (see FIG. 3), i.e., the recess 54 (see FIG. 3).

In FIG. 10, the weight 69 projects from the rim 53 toward the center of the wheel 25.

As described above, the present invention resides in that the wheel 25 includes the integral weight 69 for counterbalancing the tire air pressure detecting device 41, disposed 180° opposite to the position of the tire air pressure detecting device 41 on the rim 53.

With the weight 69 being integral with the rim 53, the wheel 25 can easily be balanced without the need for a special counterbalance attached or applied to the wheel 25 for balancing the wheel 25. Therefore, the workability of the wheel 25 can be improved.

Figure 11A:
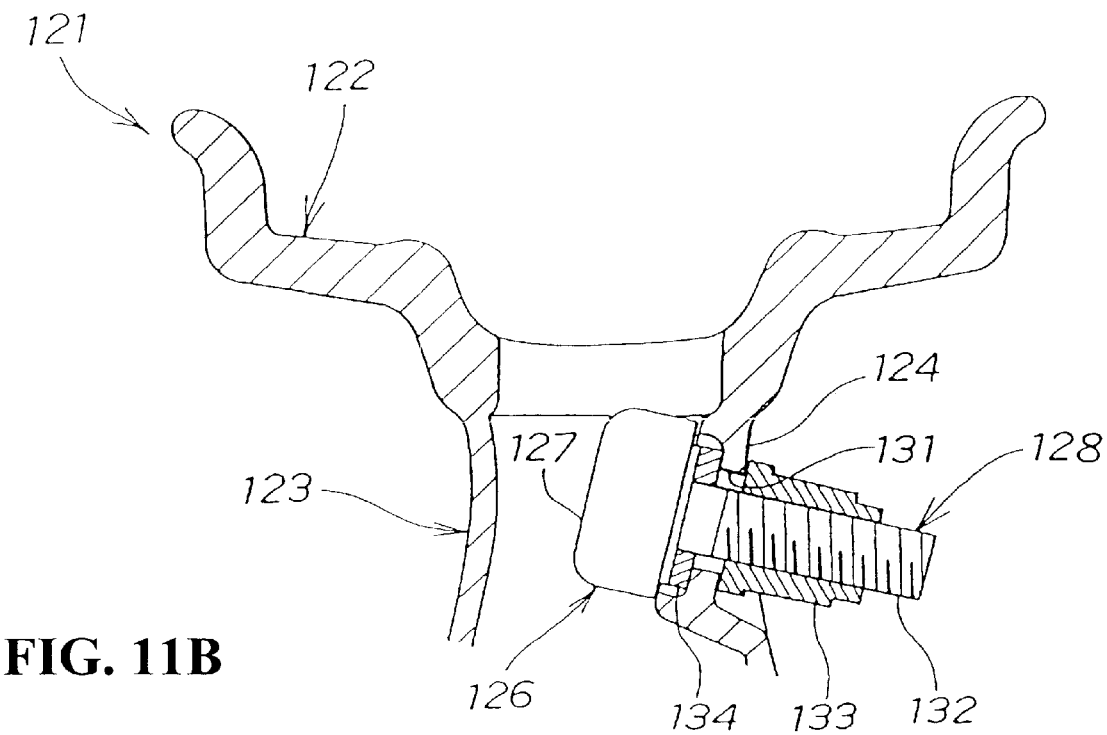
FIGS. 11A and 11B are cross-sectional views showing other embodiments of the tire air pressure detecting device of the air pressure detecting apparatus according to the present invention.
Figure 11B:
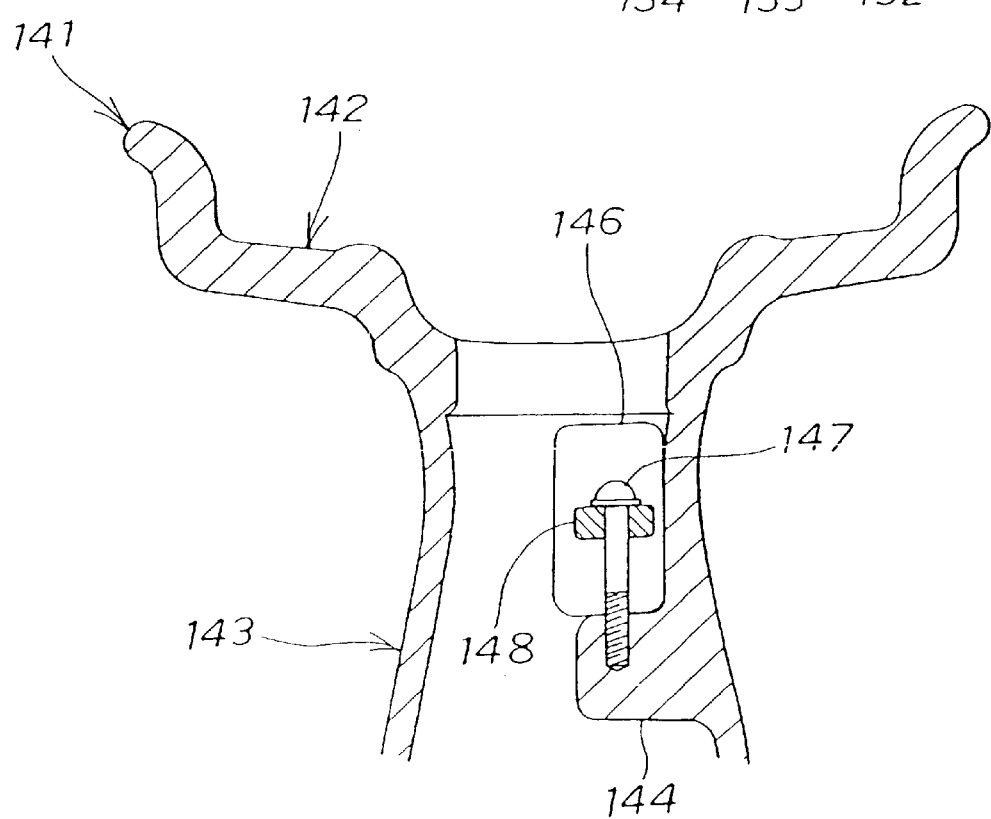

FIGS. 11A and 11B are cross-sectional views showing other embodiments of the tire air pressure detecting device of the air pressure detecting apparatus according to the present invention.

In FIG. 11A, a wheel 121 includes a rim 122 and a spoke 123 extending from the rim 122 and connected to a hub, not shown. A tire air pressure detecting device 126 is mounted on a mount 124 of the spoke 123.

The tire air pressure detecting device 126 includes a main detector body 127 and a tire valve 128 attached to the main detector body 127. The main detector body 127 is disposed in the spoke 123, and the tire valve 128 is inserted in a valve insertion hole 131 defined in the mount 124. A nut 133 is threaded over an externally threaded outer circumferential surface 132 of the tire valve 128, thus fastening the tire air pressure detecting device 126 to the spoke 123 of the wheel 121. A seal member 134 serves to prevent air from leaking out from the air chamber in the tire and the spoke 123.

The main detector body 127 is identical in structure to the above main detector body 51 (see FIG. 3), and will not be described below.

In FIG. 11B, a wheel 141 includes a rim 142 and a spoke 143 extending from the rim 142 and connected to a hub, not shown. The spoke 143 has a land 144 disposed therein, and a tire air pressure detecting device 146 is mounted on the land 144 by screws 147 (the screw 147 behind the illustrated screw 147 is omitted from illustration). The tire air pressure detecting device 146 has a flange 148 disposed on a side thereof.

The tire air pressure detecting device 146 is separate from a tire valve. The tire air pressure detecting device 146 is structurally identical to the main detector body 51 (see FIG. 3) and the main detector body 127 (see FIG. 11A) and will not be described below.

Figure 12:
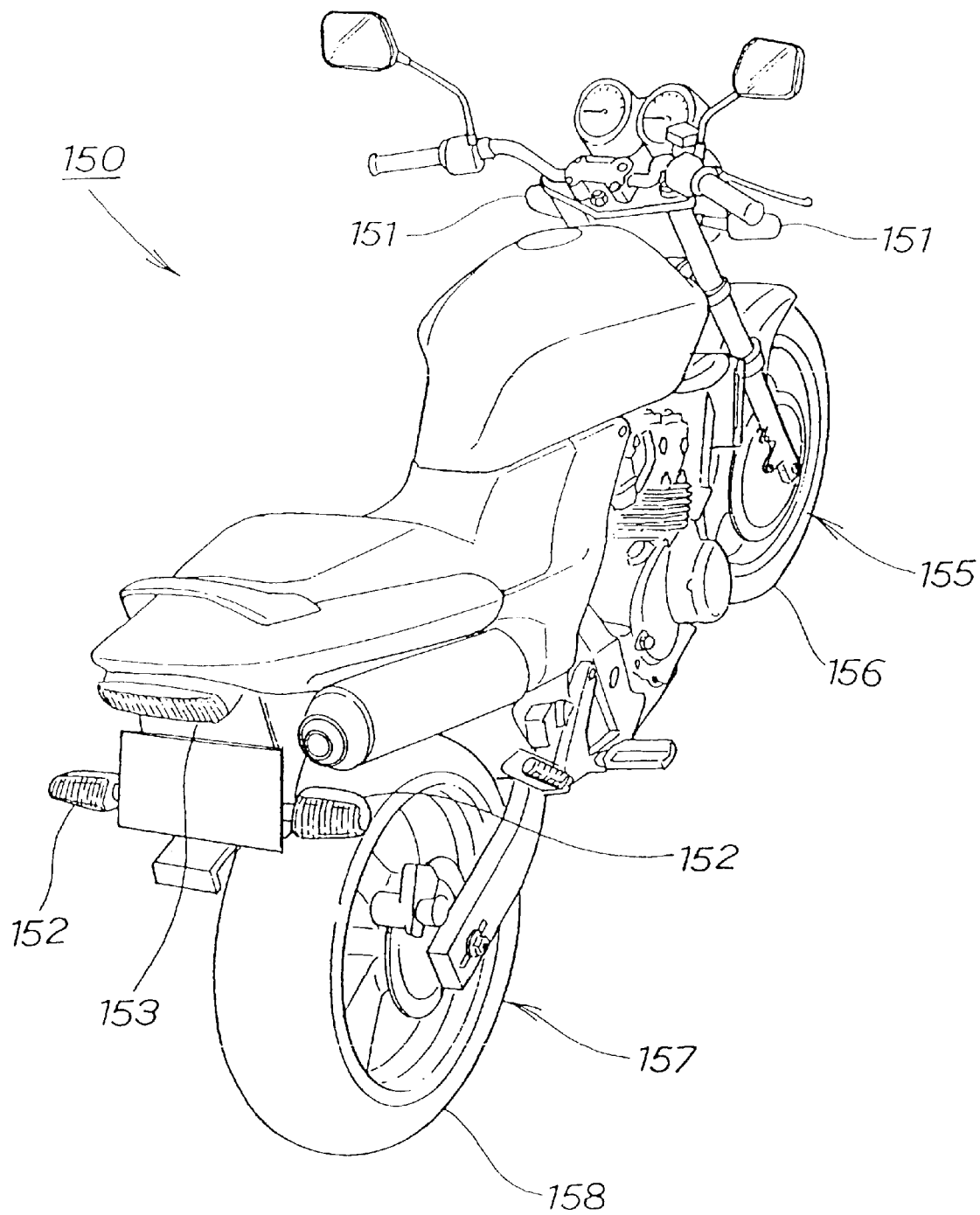
FIG. 12 is a view showing another embodiment of the warning means of the air pressure detecting apparatus according to the present invention.

FIG. 12 is a view showing another embodiment of the warning means of the air pressure detecting means according to the present invention. The warning means includes a light-emitting member which may be a lamp such as front turn signal lamps 151, rear turn signal lamps 152, and a stop lamp 153.

Specifically, when the actual air pressure Pt of a tire 156 of a front wheel 155 and a tire 158 of a rear wheel 157 drops below the air pressure threshold Pb, control means (not shown) of an air pressure detecting device (not shown, but identical to the air pressure detecting device 40 shown in FIG. 1) on a motorcycle 150 outputs a signal to flicker or turn on the front turn signal lamps 151 and rear turn signal lamps 152 as hazard lamps (danger indicator lamps), and simultaneously or independently flicker or turn on the stop lamp 153.

In this manner, a malfunction of the motorcycle 150 while it is running or at rest can reliably be indicated to the rider or other motor vehicles or pedestrians to allow them to avoid the malfunction with ease.

Since the front turn signal lamps 151, the rear turn signal lamps 152, and the stop lamp 153 on the motorcycle 150 are used as the warning means, no special warning means needs to be added to the motorcycle 150, and hence the cost of parts of the air pressure detecting apparatus can be reduced.

In addition to the stop lamp 153, a tail lamp (not shown) may be flickered (or turned on).

Embodiments other than the above embodiments will be described below.

The warning map may be represented by a linear line such that the air pressure rate is constant regardless of the vehicle speed, a curve such that the rate of increase of the air pressure rate becomes progressively smaller as the vehicle speed increases, or a curve such that the air pressure rate increases stepwise as the vehicle speed increases.

The light-emitting member of the warning means includes a lamp or lamps in the above embodiments. However, the light-emitting member may comprise an LED or a liquid crystal with back light. The sound-generating member includes a speaker or speakers in the above embodiments. However, the sound-generating member may include a buzzer, a bell, a siren, a drum, or a whistle.

The warning means may include a vibration-generating member for issuing a warning with vibrations instead of or in addition to the light-emitting member and the sound-generating member.

The vehicle speed detecting means may not be included in the tire air pressure detecting apparatus, but may be independently mounted on a wheel of the vehicle.

The engine output may be changed by a fuel supply quantity adjusting valve disposed in the intake passage of the engine for reducing the quantity of supplied fuel or cutting off supplied fuel, or by sending a fuel supply quantity adjusting signal or a fuel cutting signal from the second control means 82 to an engine control unit to reduce the quantity of supplied fuel or cutting off supplied fuel, instead of the throttle opening changing means. In addition, means for turning off or retarding ignition may be employed.

In the above embodiments, the front wheel tire air pressure detecting device 41 and the rear wheel tire air pressure detecting device 42 are structurally identical to each other. However, the wheel tire air pressure detecting devices 41, 42 may be of different shapes and dimensions to match the diameters and widths of the tires and wheels.

The warning means including the light-emitting member and the sound-generating member may be installed on or around the instrumental panel 24 shown in FIG. 1, rather than within the helmet. With this arrangement, the warning means can be easily visually recognized as well as the various instruments in the instrument panel, and the warning sound can easily heard. The warning sound may be in the form of a voice sound.

The air pressure detecting apparatus 40 is not limited to use on motorcycles, but may be used on three-wheeled vehicles and four-wheeled vehicles.

The present invention thus constructed offers the following advantages:

The tire air pressure detecting apparatus for a motor vehicle according to the first aspect of the present invention includes a small number of constituent elements including tire air pressure detecting means and control means for reducing engine output under certain conditions. The tire air pressure detecting apparatus can hence easily be reduced in size and cost.

The tire air pressure detecting apparatus according to the second aspect of the present invention includes tire air pressure detecting means for detecting the air pressure of a tire of a motorcycle, and wherein actual air pressure detected by the tire air pressure detecting means is compared with a stored air pressure threshold, and when the actual air pressure becomes lower than the air pressure threshold, a light-emitting member or a sound-generating member disposed on or around an instrumental panel is operated to issue a warning. When the actual air pressure of the tire drops below the air pressure threshold, the light-emitting member or the sound-generating member disposed on or around the instrumental panel is operated to issue a warning. Accordingly, even in bright and noisy areas, the light-emitting member is easily visually recognizable as well as other various instruments, allowing a motorcycle driver to be reliably informed of the reduction in the air pressure.

If both the light-emitting member and the sound-generating member are operated, then the effect of the warning is increased further.

The tire air pressure detecting apparatus for a motor vehicle according to the third aspect of the present invention includes tire air pressure detecting means for detecting the air pressure of a tire of a motorcycle, and wherein actual air pressure detected by the tire air pressure detecting means is compared with a stored air pressure threshold, and when said actual air pressure becomes lower than the air pressure threshold, a light-emitting member or a sound-generating member installed in a driver's helmet is operated to issue a warning. Accordingly, even in bright and noisy areas, the light-emitting member is easily visually recognizable, allowing a motorcycle driver to be reliably informed of the reduction in the air pressure.

If both the light-emitting member and the sound-generating member are operated, then the effect of the warning is increased further.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An apparatus for detecting tire air pressure in a motor vehicle, comprising:

tire air pressure detecting means for detecting an actual air pressure of a tire of the motor vehicle;

first control means for detecting an air pressure signal from said tire air pressure detecting means at a predetermined frequency, said first control means comprising means for setting the predetermined frequency for detecting said actual tire air pressure depending on a speed of the vehicle detected by vehicle speed detecting means; and second control means for comparing the actual air pressure detected by the tire air pressure detecting means with a stored air pressure threshold, said second control means including means for performing a predetermined operation when said actual air pressure falls below the stored air pressure threshold, said means for performing a predetermined operation including means for controlling engine output.

2. The apparatus for detecting tire air pressure in a motor vehicle according to claim 1, wherein said means for performing a predetermined operation includes means for operating a light-emitting member or a sound-generating member disposed on or around an instrumental panel of the motor vehicle to issue a warning to a driver of the motor vehicle.

3. The apparatus for detecting tire air pressure in a motor vehicle according to claim 1, wherein said means for performing a predetermined operation includes means for operating a light-emitting member or a sound-generating member installed in a driver's helmet to issue a warning to the drive of the motor vehicle.

4. The apparatus for detecting tire air pressure in a motor vehicle according to claim 1, further comprising:

tire temperature detecting means for detecting a temperature of tire; and display means for displaying the tire air pressure and the tire temperature.

5. The apparatus for detecting tire air pressure in a motor vehicle according to claim 1, further comprising display means for displaying the tire air pressure and the vehicle speed.

6. The apparatus for detecting tire air pressure in a motor vehicle according to claim 1, further comprising:

air suspension air pressure detecting means for detecting an air pressure of an air suspension of the motor vehicle; and display means for displaying the tire air pressure and the air suspension air pressure.

7. The apparatus for detecting tire air pressure in a motor vehicle according to claim 1, wherein said first control means increases the frequency of detecting the tire air pressure in direct proportion to the speed of the vehicle.

8. A method of detecting tire air pressure in a motor vehicle, comprising the steps of:

detecting an actual air pressure of a tire of a motor vehicle at a predetermined frequency;

comparing the actual air pressure detected by the tire air pressure detecting means with a stored air pressure threshold;

performing a predetermined operation when said actual air pressure falls below the stored air pressure threshold, and controlling engine output accordingly;

detecting a speed of the motor vehicle; and setting the predetermined frequency for detecting said actual tire air pressure depending on a speed of the vehicle detected by vehicle speed detecting means.

9. The method of detecting tire air pressure in a motor vehicle according to claim 8, wherein said step of performing a predetermined operation includes a step of operating a light-emitting member or a sound-generating member disposed on or around an instrument panel of the motor vehicle to issue a warning to a driver of the motor vehicle.

10. The method of detecting tire air pressure in a motor vehicle according to claim 8, wherein said step of performing a predetermined operation includes a step of operating a light-emitting member or a sound-generating member installed in a driver's helmet to issue a warning to the driver of the motor vehicle.

11. The method of detecting tire air pressure in a motor vehicle according to claim 8, further comprising the steps of:

detecting a temperature of tire; and displaying the tire air pressure and the tire temperature.

12. The method of detecting tire air pressure in a motor vehicle according to claim 8, further comprising the step of displaying the tire air pressure and the vehicle speed.

13. The method of detecting tire air pressure in a motor vehicle according to claim 8, further comprising the steps of:

detecting an air pressure of an air suspension of the motor vehicle; and displaying the tire air pressure and the air suspension air pressure.

* * * * *